United States Patent
Ohara

(10) Patent No.: US 11,318,693 B2
(45) Date of Patent: May 3, 2022

(54) TIRE VULCANIZATION MOLD, TIRE VULCANIZATION DEVICE, AND TIRE PRODUCTION METHOD

(71) Applicant: Toyo Tire Corporation, Itami (JP)

(72) Inventor: Masaaki Ohara, Itami (JP)

(73) Assignee: TOYO TIRE CORPORATION, Itami (JP)

(*) Notice: Subject to any disclaimer, the term of this patent is extended or adjusted under 35 U.S.C. 154(b) by 624 days.

(21) Appl. No.: 16/321,573

(22) PCT Filed: Aug. 12, 2016

(86) PCT No.: PCT/JP2016/003734
§ 371 (c)(1),
(2) Date: Jan. 29, 2019

(87) PCT Pub. No.: WO2018/029731
PCT Pub. Date: Feb. 15, 2018

(65) Prior Publication Data
US 2021/0299987 A1 Sep. 30, 2021

(51) Int. Cl.
*B29D 30/06* (2006.01)
*B29C 33/00* (2006.01)

(52) U.S. Cl.
CPC ........ *B29D 30/0606* (2013.01); *B29C 33/005* (2013.01); *B29D 30/0629* (2013.01); *B29D 2030/0607* (2013.01)

(58) Field of Classification Search
CPC .......................... B29D 30/0629; B29C 33/005
See application file for complete search history.

(56) References Cited

U.S. PATENT DOCUMENTS

| | | | |
|---|---|---|---|
| 3,057,011 A | 10/1962 | Knox | |
| 3,460,197 A | 8/1969 | Cantarutti et al. | |
| 3,464,090 A | 9/1969 | Cantarutti | |
| 3,553,789 A * | 1/1971 | Allitt | B29D 30/0629 425/36 |
| 3,682,576 A | 8/1972 | Gross | |

(Continued)

FOREIGN PATENT DOCUMENTS

| | | |
|---|---|---|
| CN | 1538916 A | 10/2004 |
| CN | 104023930 A | 9/2014 |

(Continued)

OTHER PUBLICATIONS

Office Action dated May 12, 2020, issued in counterpart JP Application No. 2018-533298, with English Translation. (6 pages).

(Continued)

*Primary Examiner* — Niki Bakhtiari
*Assistant Examiner* — John J DeRusso
(74) *Attorney, Agent, or Firm* — WHDA, LLP

(57) ABSTRACT

A tire vulcanization mold disclosed herein includes sectors 13 divided in a tire circumferential direction and molding a tread portion 1 of a tire, and a pair of upper and lower side plates 11 and 12 molding a sidewall portion 2 of the tire. Mold parting lines 16a and 17a formed by the sectors 13 and a pair of the upper and lower side plates 11 and 12 are located in the tread portion 1 and a distance from a tire equator CL to the mold parting lines 16a and 17a changes periodically in the tire circumferential direction.

10 Claims, 8 Drawing Sheets

(56) References Cited

U.S. PATENT DOCUMENTS

| | | | |
|---|---|---|---|
| 3,787,155 A | | 1/1974 | Zangl |
| 4,553,918 A | | 11/1985 | Yoda et al. |
| 4,895,692 A | | 1/1990 | Laurent et al. |
| 5,190,767 A | * | 3/1993 | Beres ................ B29D 30/0629 |
| | | | 425/28.1 |
| 5,208,044 A | | 5/1993 | Miyata et al. |
| 6,066,283 A | | 5/2000 | Nara et al. |
| 6,250,901 B1 | | 6/2001 | Nagata |
| 6,408,910 B1 | | 6/2002 | Lagnier et al. |
| 6,808,377 B1 | * | 10/2004 | Loney ................ B29D 30/0629 |
| | | | 264/102 |
| 6,955,782 B1 | | 10/2005 | Ratliff, Jr. |
| 7,281,555 B2 | * | 10/2007 | Ono ........................ B60C 11/00 |
| | | | 152/209.13 |
| 7,459,117 B2 | | 12/2008 | Girard et al. |
| 9,079,457 B2 | * | 7/2015 | Aoki ................... B60C 11/1323 |
| 10,150,338 B2 | * | 12/2018 | Sato ........................ B60C 11/13 |
| 10,322,609 B2 | * | 6/2019 | Kakuta ................... B60C 11/11 |
| 10,576,665 B2 | * | 3/2020 | Ohara ................ B29D 30/0629 |
| 10,843,426 B2 | * | 11/2020 | Ohara ..................... B29C 33/02 |
| 2003/0143294 A1 | | 7/2003 | Fike |
| 2004/0211502 A1 | | 10/2004 | Ono |
| 2007/0166419 A1 | | 7/2007 | Tanaka et al. |
| 2008/0191389 A1 | | 8/2008 | Hyodo |
| 2010/0303941 A1 | | 12/2010 | Secchi et al. |
| 2011/0117229 A1 | | 5/2011 | Bachochin |
| 2014/0377392 A1 | | 12/2014 | Yaguchi |
| 2017/0210180 A1 | | 7/2017 | Sato et al. |

FOREIGN PATENT DOCUMENTS

| | | | |
|---|---|---|---|
| DE | 1805178 | * | 5/1970 |
| JP | H07-314459 A | | 12/1995 |
| JP | H10-119050 A | | 5/1998 |
| JP | 2000-84936 A | | 3/2000 |
| JP | 2001-96538 A | | 4/2001 |
| JP | 2002-067625 A | | 3/2002 |
| JP | 2002-172624 A | | 6/2002 |
| JP | 2009-6600 A | | 1/2009 |
| JP | 2014-117924 A | | 6/2014 |
| JP | 2015-189349 A | | 11/2015 |
| WO | 2016/013604 A1 | | 1/2016 |

OTHER PUBLICATIONS

International Search Report dated Oct. 11, 2016, issued in counterpart International Application No. PCT/JP2016/003734 (1 page).
Office Action dated Jul. 3, 2020, issued in counterpart CN Application No. 201680087971.1, with English translation (13 pages).
Office Action dated Jun. 30, 2020, issued in CN application No. 201680087880.8 (counterpart to U.S. Appl. No. 16/321,972), with English translation. (12 pages).
Office Action dated May 12, 2020, issued in JP application No. 2018-533293 (counterpart to U.S. Appl. No. 16/321,972), with English translation. (6 pages).
Office Action dated Feb. 22, 2021, issued in CN application No. 201680087924.7 (counterpart to U.S. Appl. No. 16/321,992), with English translation. (22 pages).
Office Action dated Jun. 18, 2021, issued in CN application No. 201680087924.7 (counterpart to U.S. Appl. No. 16/321,992), with English translation. (22 pages).
International Search Report dated Nov. 1, 2016, issued in International application No. PCT/JP2016/003729 (counterpart to U.S. Appl. No. 16/321,972). (2 pages).
Non-Final Office Action dated Sep. 16, 2019, issued in U.S. Appl. No. 16/321,972. (15 pages).
International Search Report dated Nov. 1, 2016, issued in International application No. PCT/JP2016/003730 (counterpart to U.S. Appl. No. 16/321,992). (1 pages).
Non-Final Office Action dated Jun. 25, 2020, issued in U.S. Appl. No. 16/321,992. (15 pages).
Office Action dated May 12, 2020, issued in JP application No. 2018-533294 (counterpart to U.S. Appl. No. 16/321,992), with English translation. (6 pages).
Office Action dated Jun. 22, 2020, issued in CN application No. 201680087924.7 (counterpart to U.S. Appl. No. 16/321,992), with English translation. (20 pages).

* cited by examiner

TIRE VULCANIZATION MOLD, TIRE VULCANIZATION DEVICE, AND TIRE PRODUCTION METHOD

TECHNICAL FIELD

The present invention relates to a tire vulcanization mold, a tire vulcanization device including the tire vulcanization mold, and a tire production method.

BACKGROUND ART

A tire is produced by preparing an unvulcanized green tire first and then by vulcanizing the green tire while molding the green tire into a predetermined shape by using a tire vulcanization device.

A tire vulcanization device known in the art includes a vulcanization mold used to mold a green tire into a predetermined shape, which includes sectors for forming a tread portion of a tire, and a pair of upper and lower side plates for forming a sidewall portion of the tire.

While the tire vulcanization device is in a mold open state in which the upper side plate and the sectors are spaced apart from the lower side plate, a green tire is set on the lower side plate. Then, by moving down the upper side plate and moving the sectors inward in a tire radial direction, the tire vulcanization device is changed to a mold close state in which the upper side plate and the sectors are in close proximity to the lower side plate. The multiple sectors are divided in a circumferential direction. The sectors are radially separated in the mold open state whereas the sectors gather together and form an annular shape in the mold close state.

A pattern of various rugged shapes is provided to an outer surface of the tread portion and the sidewall portion. A rugged shape continuing from the tread portion to the sidewall portion is provided in some cases to make a design of the tire more sophisticated. In a case where such a pattern is provided, when mold parting lines formed by the sectors and the side plates are disposed to the sidewall portion, rubber squeezed out from the mold parting lines may possibly set at an easy-to-notice spot in outward appearance.

Meanwhile, a technique to dispose mold parting lines formed by the sectors and the side plates to the tread portion is known in the art (see Patent Literatures 1 and 2). With this technique, rubber squeezed out in the easy-to-notice sidewall portion can be limited.

CITATION LIST

Patent Literatures

Patent Literature 1: JP-A-2001-96538
Patent Literature 2: JP-A-2000-84936

SUMMARY OF INVENTION

Technical Problem

However, in a case where the mold parting lines are disposed to the tread portion, when the sectors and the side plates become misaligned in a circumferential direction, an influence may possibly be given not only to outward appearance but also to tire performance.

In view of the foregoing problems, the present invention has an object to provide a tire vulcanization mold having a mold parting line disposed to a tread portion and capable of limiting misalignment of sectors and side plates in a circumferential direction.

Solution to Problem

A tire vulcanization mold of the present invention is a tire vulcanization mold used to vulcanize and mold a tire, which includes sectors divided in a tire circumferential direction and molding a tread portion of the tire, and a pair of upper and lower side plates molding a sidewall portion of the tire. Mold parting lines formed by the sectors and a pair of the upper and lower side plates are located in the tread portion and a distance from a tire equator to the mold parting lines changes periodically in the tire circumferential direction.

In one embodiment, the tread portion may include a first land portion having a first tread end and a second land portion having a second tread end located on an outer side than the first tread end in a tire width direction, and the mold parting line may include a first line segment extending along the first tread end and a second line segment extending along the second tread end. In another embodiment, respective bent portions of the mold parting line may be formed in a curved shape. In still another embodiment, the mold parting line may be set to pass a bend point of a surface design in the tread portion. In such a case, the bend point of the surface design may be a bend point of a ridge line along a lateral groove in a land portion located in a shoulder region of the tread portion.

A tire vulcanization device of the present invention includes any one of the tire vulcanization molds configured as above, a segment fixed to the sector and moving the sector in a tire radial direction, and a pair of upper and lower attachment plates fixed to a pair of the upper and lower side plates, respectively, and supporting the segment in a slidable manner.

In one embodiment, the tire vulcanization device may be configured in such a manner that the segment includes a pair of upper and lower sliding surfaces sliding on a pair of the upper and lower attachment plates, respectively, a pair of the upper and lower sliding surfaces inclines toward a center in a tire width direction more on an outer side in a tire radial direction, and when the segment moves the sector outward in the tire radial direction, a pair of the upper and lower sliding surfaces slides on a pair of the upper and lower attachment plates, respectively, and spacings at mold parting planes including the mold parting lines widen. In such a case, the mold parting planes including the mold parting lines may be provided parallel to the tire radial direction.

A tire production method of the present invention includes a forming step of forming a green tire, and a vulcanizing step of vulcanizing and molding the green tire by using the tire vulcanization device configured as above.

Advantageous Effects of Invention

According to the embodiments above, by changing the distance from the tire equator to the mold parting lines periodically in the tire circumferential direction, misalignment of the sectors and the side plates in the circumferential direction can be limited.

DESCRIPTION OF EMBODIMENTS

Hereinafter, embodiments of the present invention will be described with reference to the drawings.

Figure 1:
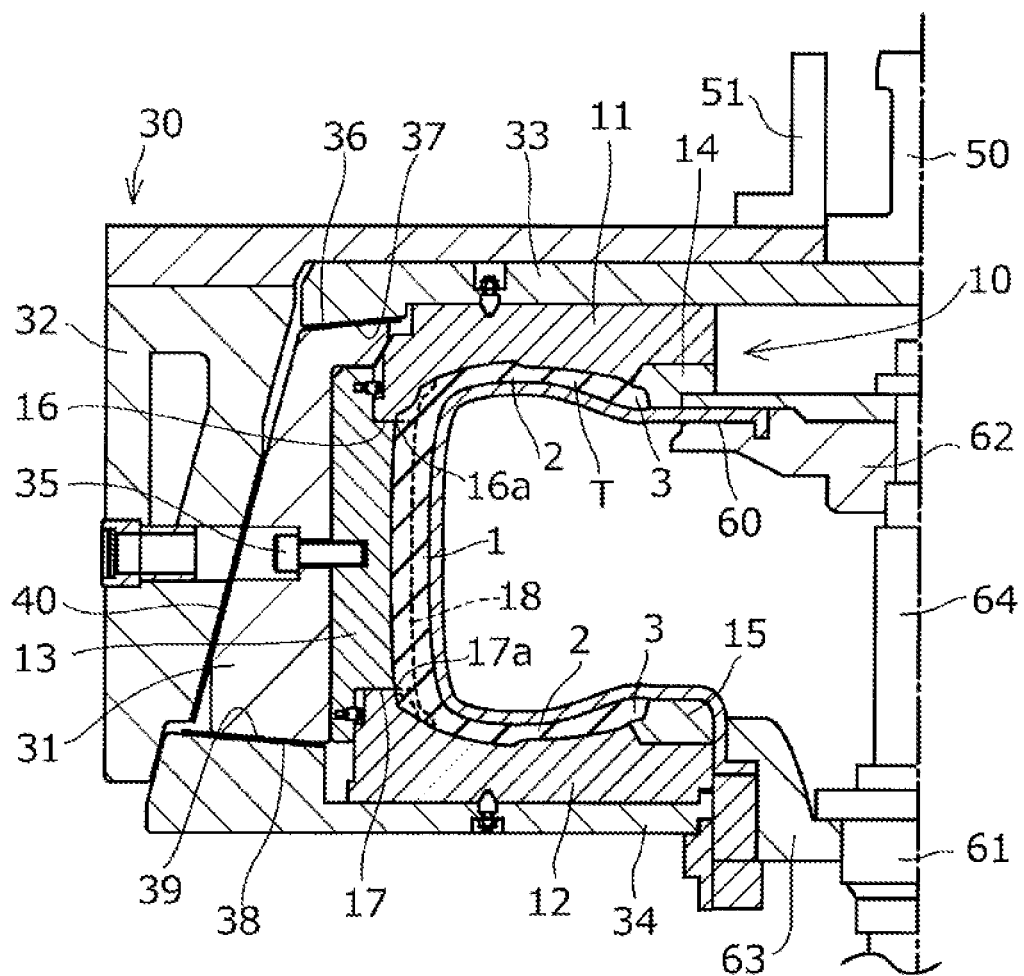
FIG. 1 is a half sectional view showing a tire vulcanization device according to one embodiment during vulcanization.

As is shown in FIG. 1, a tire vulcanization device includes a tire vulcanization mold (hereinafter, referred to simply as a vulcanization mold) 10, a container 30 to which the vulcanization mold 10 is attached, first lifting means 50 and second lifting means 51 which lift the vulcanization mold 10 and the container 30 up and down, and a bladder 60. The tire vulcanization device vulcanizes an unvulcanized green tire set with a tire axial direction aligned in a top-bottom direction while molding the green tire into a predetermined shape by heating and application of pressure.

The vulcanization mold 10 is a mold which includes a pair of an upper side plate 11 and a lower side plate 12, multiple sectors 13 divided in a circumferential direction, and a pair of upper and lower bead rings 14 and 15, and forms an outer surface (design surface) of a tire T. The vulcanization mold 10 can be made of a metal material, such as aluminum, aluminum alloy, and iron.

The sectors 13 are a mold which molds a tread portion 1 of the tire T. The multiple (for example, nine) sectors 13 are divided in a tire circumferential direction and allowed to undergo displacement radially (in a tire radial direction) by expansion and contraction. In a mold close state in which the respective sectors 13 are disposed at mold closing positions, the sectors 13 situated adjacently in the tire circumferential direction gather together and form an annular shape.

The upper side plate 11 is a mold which molds a sidewall portion 2 and a bead portion 3 disposed on an upper side of the tire T. The lower side plate 12 is a mold which molds a sidewall portion 2 and a bead portion 3 disposed on a lower side. The bead rings 14 and 15 are provided, respectively, on an inside of the upper side plate 11 and the lower side plate 12 in the tire radial direction. The bead rings 14 and 15 are formed for the bead portions 3 of the tire T to fit in.

The vulcanization mold 10 includes parting lines of a coupled mold which divide the mold in a tire width direction, to be more specific, a mold parting line 16a formed by the sectors 13 and the upper side plate 11 and a mold parting line 17a formed by the sectors 13 and the lower side plate 12. The mold parting lines 16a and 17a are located in the tread portion 1 of the tire T. Hence, the vulcanization mold 10 is configured to separate the sectors 13 from a pair of the upper and lower side plates 11 and 12 in the tire width direction in a tread surface.

Both of mold parting planes including the mold parting lines 16a and 17a, to be more specific, a mold parting plane 16 which is a coupled surface of the sectors 13 and the upper side plate 11 and a mold parting plane 17 which is a coupled surface of the sectors 13 and the lower side plate 12 extend outward in the tire radial direction from the mold parting lines 16a and 17a, respectively. Herein, both of the mold parting planes 16 and 17 are provided parallel (that is, horizontal) to the tire radial direction in which the sectors 13 move. The mold parting lines 16a and 17a are parting lines located at inner ends of the mold parting planes 16 and 17, that is, at ends facing a cavity.

Figure 2:
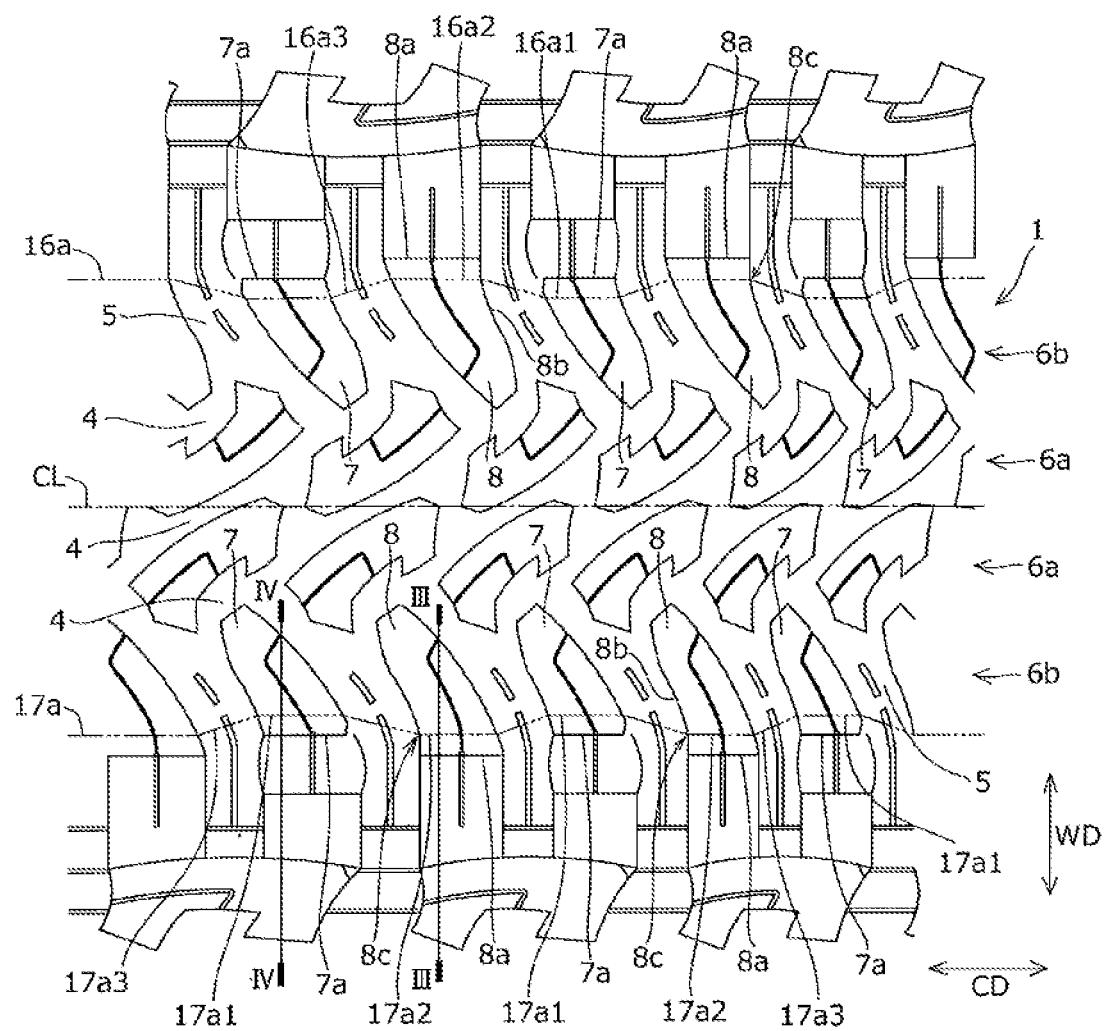
FIG. 2 is a plan view of a tread pattern of the embodiment.

In the present embodiment, as is shown in FIG. 2, the mold parting lines 16a and 17a are set to change a distance from the tire equator CL periodically in the tire circumferential direction in the shoulder regions of the tread portion 1. More specifically, the mold parting lines 16a and 17a are zigzag lines extending in the tire circumferential direction while wobbling in the tire width direction when viewed in plane, and formed by repeating a predetermined pattern in the tire circumferential direction.

A location and a configuration of the mold parting lines 16a and 17a will now be described according to FIG. 2 through FIG. 5.

As is shown in FIG. 2, the tread portion 1 includes multiple blocks divided by main grooves 4 extending in the tire circumferential direction while bending and lateral grooves 5 crossing the main grooves 4. In FIG. 2, the tire circumferential direction is a direction indicated by an arrow CD and the tire width direction is a direction indicated by an arrow WD. An inner side in the tire width direction (that is, on a side closer to a center) means a direction coming closer to a tire equator CL and an outer side in the tire width direction means a direction moving away from the tire equator CL.

The tread portion 1 has a pair of center block rows 6a and 6a located in a center region including the tire equator CL, and a pair of shoulder block rows 6b and 6b located in shoulder regions on both sides of the center block rows 6a and 6a. The shoulder regions mean regions located at ends of the tread portion in the tire width direction, in other words, regions sandwiched between the main grooves and tire contact ends and including the tire contact ends.

Figure 3:
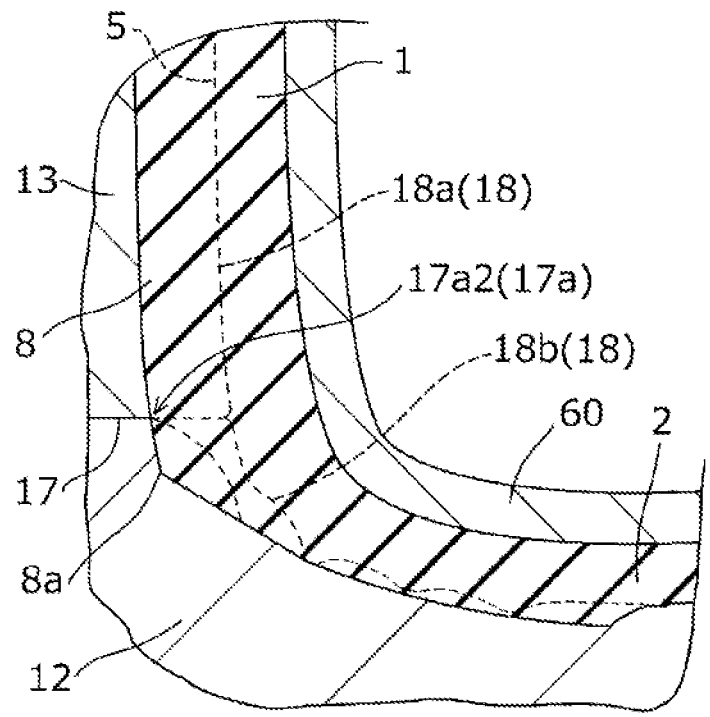
FIG. 3 is a sectional view taken along the line III-III of FIG. 2 during tire vulcanization.
Figure 4:
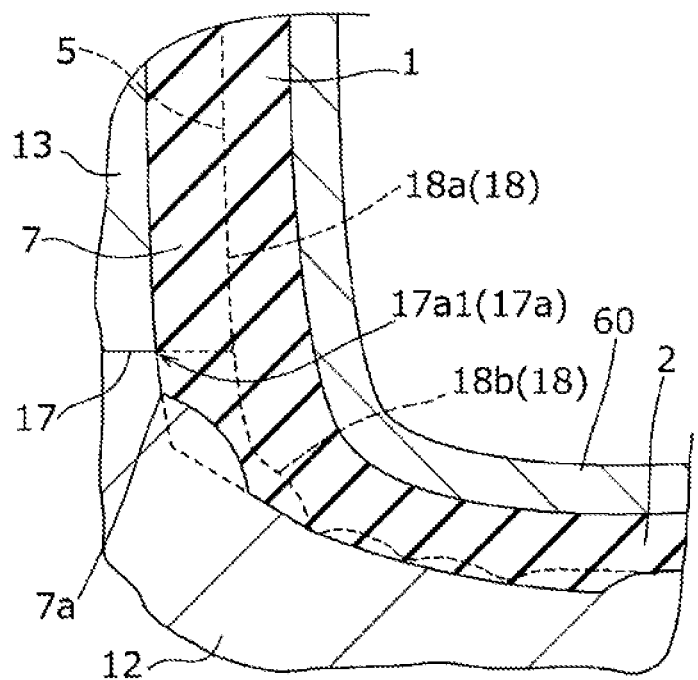
FIG. 4 is a sectional view taken along the line IV-IV of FIG. 2 during tire vulcanization.

As are shown in FIG. 2 through FIG. 4, the shoulder block row 6b includes a first land portion (block) 7 having a first tread end 7a and a second land portion (block) 8 having a second tread end 8a located on the outer side than the first tread end 7a in the tire width direction. Herein, the shoulder block row 6b is formed by providing the first land portion 7 and the second land portion 8 extending more to the outside than the first land portion 7 in the tire width direction alternately in the tire circumferential direction. Tread ends of land portions mean an outer contact end of each land portion in the tire with direction.

In the present embodiment, the mold parting lines 16a and 17a in the tread pattern as above have first line segments 16a1 and 17a1 extending along the first tread end 7a and second line segments 16a2 and 17a2 extending along the second tread end 8a, respectively. The phrase, "extending along the tread end", referred to herein means to extend parallel to the tread end in the vicinity of the tread end.

More specifically, the first line segments 16a1 and 17a1 are linear portions extending parallel to the tire circumferential direction on the inner side than the first tread end 7a in the tire width direction in the first land portion 7 when viewed in plane as is shown in FIG. 2 and set to traverse the first land portion 7. The first line segments 16a1 and 17a1 are located in the vicinity of the first tread end 7a and a distance D1 between the first line segments 16a1 and 17a1 and the first tread end 7a (see FIG. 5) is not particularly limited and may be, for example, 10 mm or less.

The second line segments 16a2 and 17a2 are linear portions extending parallel to the tire circumferential direction on the inner side than the second tread end 8a in the tire width direction in the second land portion 8 when viewed in plane as is shown in FIG. 2 and set to traverse the second land portion 8. The second line segments 16a2 and 17a2 are located in the vicinity of the second tread end 8a and a distance D2 between the second line segments 16a2 and 17a2 and the second tread end 8a (see FIG. 5) may be, for example, 10 mm or less. It is preferable to set the distance D2 to be substantially equal to the distance D1.

The second line segments 16a2 and 17a2 traversing the second land portion 8 are located on the outer side than the first line segments 16a1 and 17a1 traversing the first land portion 7 in the tire width direction. Linear inclined line segments 16a3 and 73 extending with an inclination with respect to the tire circumferential direction when viewed in plane are provided to the lateral groove 5 between the first land portion 7 and the second land portion 8 to smoothly connect the first line segments 16al and 17al and the second line segments 16a2 and 17a2, respectively. The first line segments 16al and 17al, the second line segments 16a2 and 17a2, and the inclined portions 16a3 and 17a3 together form the mold parting lines 16a and 17a, respectively. Hence, the mold parting lines 16a and 17a are of a zigzag shape with a distance from the tire equator CL changing periodically in the tire circumferential direction.

The parting lines 16a and 17a are set to pass a bend point of the surface design in the shoulder regions of the tread portion 1. The surface design means a shape of a tread surface (that is, a contact patch) also called a tread pattern, which is made up of, for example, ridge lines of a land portion, such as a block and a rib, or sipes provided to a tread portion. The bend point may be an intersection of straight lines, an intersection of curved lines, or an intersection of a straight line and a curved line.

Figure 5:
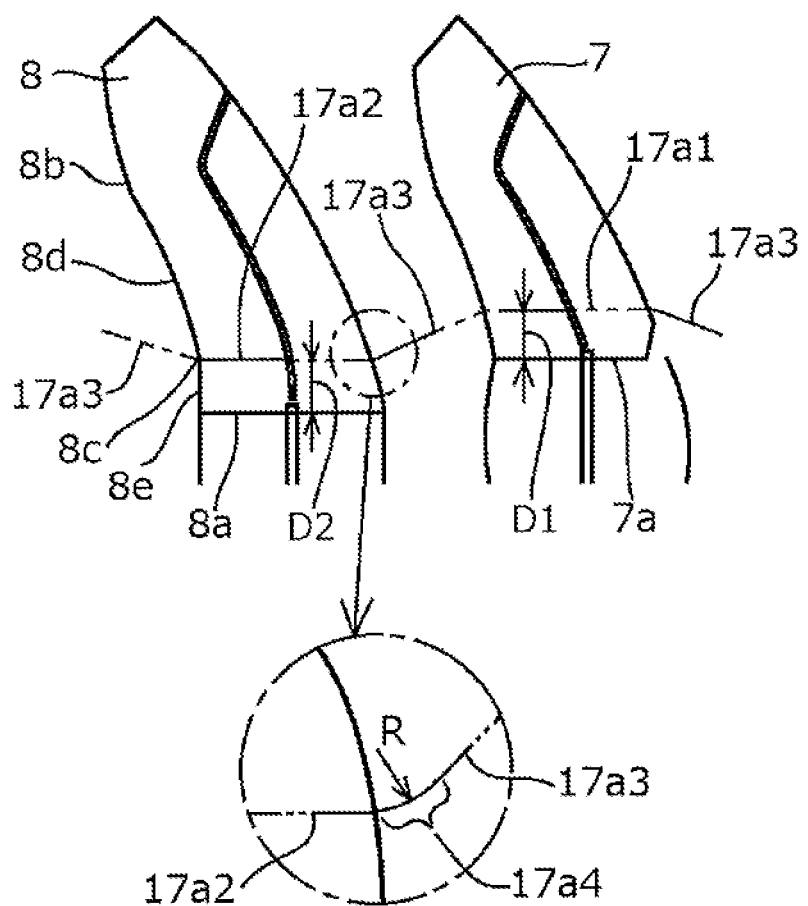
FIG. 5 is an enlarged view of a major portion of FIG. 2.

More specifically, the mold parting lines 16a and 17a are set to pass a bend point 8c of a ridge line 8b of the second land portion 8. Of all the ridge lines of each second land portion 8, the ridge line 8b is a ridge line 8b along the lateral groove 5 which divides the land portion 8 of interest. The bend point 8c of the ridge line 8b in the tread surface (that is, the contact patch) is set at a mold parting position. As is shown in FIG. 5, the bend point 8c is an intersection of a curved portion 8d and a straight potion 8e forming the ridge line 8b. The ridge line referred to herein means a line appearing where a side surface and a top surface (tread surface) of the land portion (block) intersect.

In the present embodiment, the mold parting lines 16a and 17a have multiple bent portions and extending in the tire circumferential direction and the respective bent portions are formed in a curved shape. More specifically, as is shown in an enlarged inset of FIG. 5, the linear second line segments 17a2 and the linear inclined line segment 17a3 are connected via an arc bent portion 17a4 when viewed in plane. Other bent portions, that is, bent portions connecting the first line segments 16a1 and 17al and the inclined line segments 17a3, and the bent portion connecting the second line segment 16a2 and the inclined line segment 16a3 are formed in an are shape as well. A radius of curvature, R, of the curved bent portions is not particularly limited and may be, for example, 2 to 20 mm.

To mold the tread pattern as above, the vulcanization mold 10 is provided with a main groove molding rib (not shown) used to mold the main grooves 4 in the tread portion 1 and a lateral groove molding rib 18 used to form the lateral grooves 5 (see FIG. 3 and FIG. 4). The lateral groove molding rib 18 provided to bridge from the sectors 13 to the upper side plate 11 is divided by the mold parting line 16a. The lateral groove molding rib 18 provided to bridge from the sectors 13 to the lower side plate 12 is divided by the mold parting line 17a. Hence, the lateral groove molding rib 18 includes a first rib portion 18a provided to the sectors 13 and second rib portions 18b provided to the respective side plates 11 and 12, and formed by joining the first rib portion 18a and the second rib portions 18b at the mold parting lines 16a and 17a.

The container 30 includes multiple segments 31 to hold the sectors 13, a jacket ring 32 for moving the segments 31 in the tire radial direction, an upper attachment plate 33 supporting the upper side plate 11 and the upper bead ring 14 and disposed on an upper side of the segments 31, and a lower attachment plate 34 supporting the lower side plate 12 and the lower bead ring 15 and disposed on a lower side of the segments 31.

The segments 31 are provided on the outside of the sectors 13 in the tire radial direction in a one-to-one correspondence with the divided sectors 13. The respective segments 31 are fixed to the corresponding sectors 13 with bolts 35.

On a top surface of the segment 31, an upper sliding surface 36 inclined toward a center in the tire width direction more on the outer side in the tire radial direction (that is, downward) is provided. The upper sliding surface 36 slides on an upper slide 37 provided to the upper attachment plate 33. On a bottom surface of the segment 31, a lower sliding surface 38 inclined toward the center in the tire width direction more on the outer side in the tire radial direction (that is, upward) is provided. The lower sliding surface 38 slides on a lower slide 39 provided to the lower attachment plate 34.

An angle of inclination of the upper sliding surface 36 and the lower sliding surface 38 is not particularly limited. However, an angle in a range of 5° to 10° both inclusive is preferable as the angle of inclination with respect to the tire radial direction. The upper sliding surface 36 and the lower sliding surface 38 provided to the segment 31 are preferably formed of planes having no curve and slide, respectively, on the upper slide 37 and the lower slide 39 in a surface-contact state.

A side surface of the segment 31 on an opposite side to the side surface where the sector 13 is attached (on the outer side in the tire radial direction) forms an inclined surface 40 which inclines downward and outward in the tire radial direction.

The jacket ring 32 is an annular member provided on the outside of the multiple segments 31 in the radial direction. An inner peripheral surface of the jacket ring 32 inclines along the inclined surface 40 of the segment 31 provided on the outer side in the tire radial direction, and is attached to the inclined surface 40 in a slidable manner. The jacket ring 32 moves the segments 31 in the tire radial direction as the jacket ring 32 slides on the inclined surface 40 by moving up and down relatively with respect to the segments 31. The sectors 13 are thus allowed to undergo displacement in the tire radial direction by expansion and contraction.

The upper side plate 11 and the upper slide 37 are fixed to a bottom surface of the upper attachment plate 33. The upper slide 37 is disposed on the outside of the upper side plate 11 in the tire radial direction at a position at which the upper slide 37 opposes the upper sliding surface 36 provided to the top surface of the segment 31 and supports the segment 31 in a slidable manner in the tire radial direction.

The lower side plate 12 and the lower slide 39 are fixed to a top surface of the lower attachment plate 34. The lower slide 39 is disposed on the outside of the lower side plate 12 in the tire radial direction at a position at which the lower slide 39 opposes the lower sliding surface 38 provided to the bottom surface of the segment 31 and supports the segment 31 in a slidable manner in the tire radial direction.

The first lifting means 50 lifts the upper attachment plate 33 up and down relatively with respect to the lower attachment plate 34. The second lifting means 51 lifts the jacket ring 32 up and down separately from the segments 31 supported on the upper attachment plate 33.

The bladder 60 is formed of an expandable and contractable rubber elastic body of a toroidal shape in which an axial center swells outward. The bladder 60 is set on an inner surface side of the green tire and swells with a supply of a pressurized gas (for example, steam or a nitrogen gas) and thereby applies a pressure to the green tire from inside. The bladder 60 is supported by an extendable support portion 61 at an upper end and a lower end which are both ends in an axial direction. The extendable support portion 61 includes an upper clamp ring 62 fixing the upper end of the bladder 60, a lower clamp ring 63 fixing the lower end of the bladder 60, and an extendable shaft 64 capable of extending and retracting.

A production method of a pneumatic tire using the tire vulcanization device configured as above will now be described. To produce a pneumatic tire, a green tire is formed by any method known in the art and the green tire is vulcanized and molded by using the tire vulcanization device described above.

Figure 6:
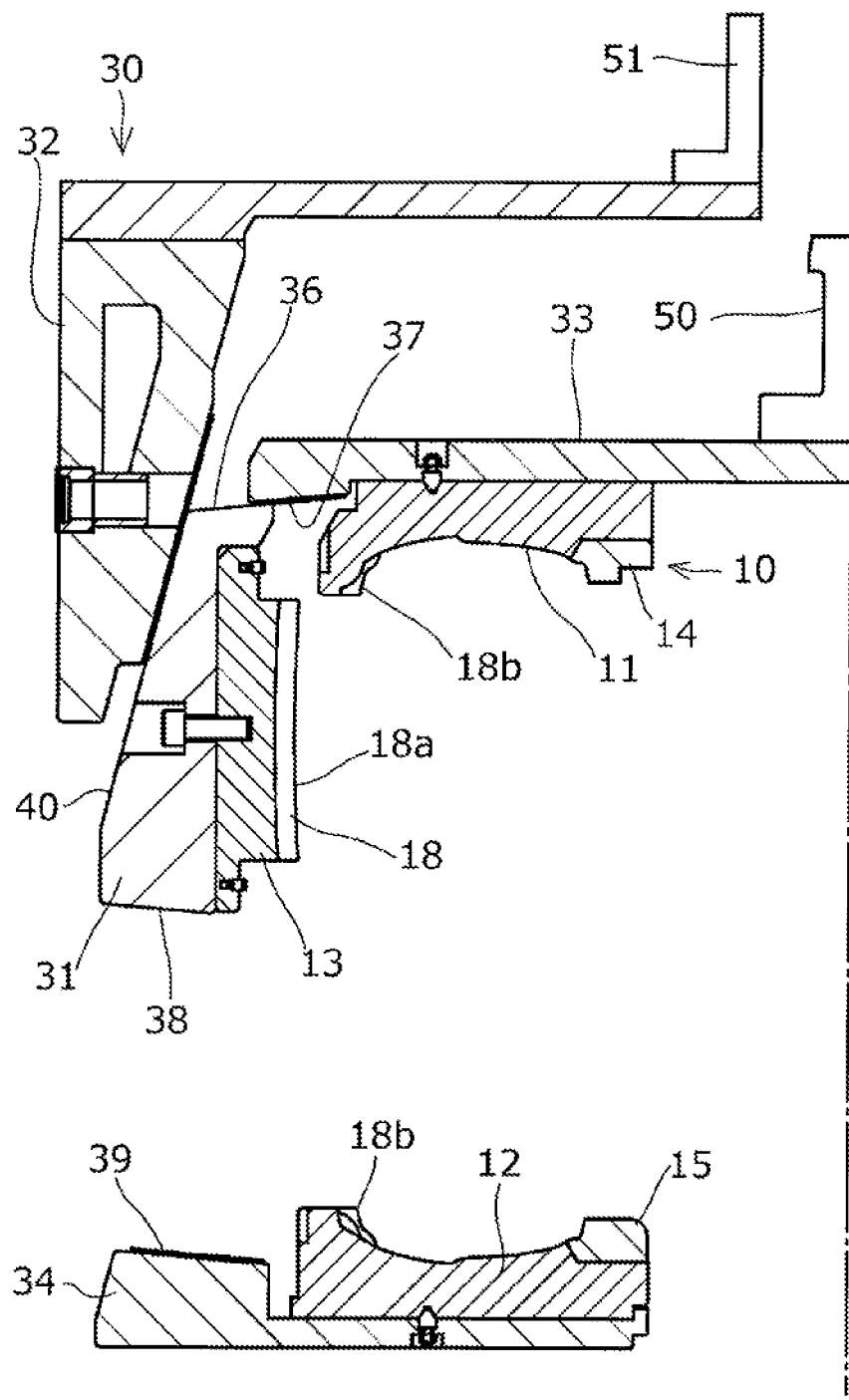
FIG. 6 is a view used to describe an opening and closing action of the tire vulcanization device.
Figure 7:
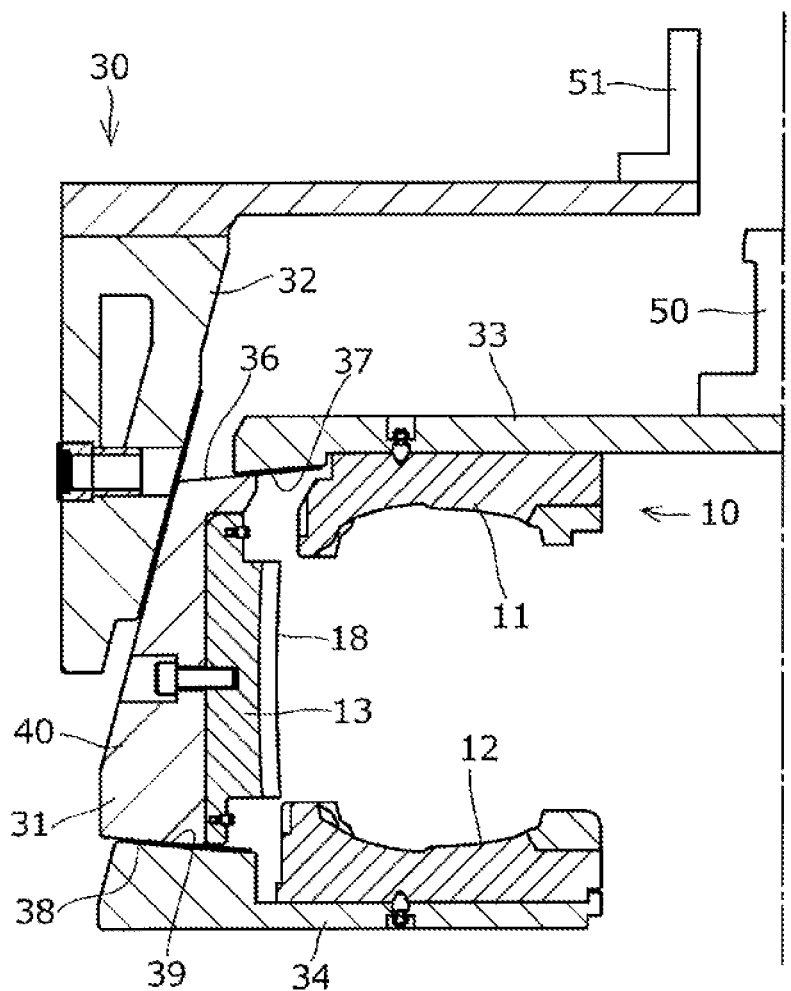
FIG. 7 is another view used to describe the opening and closing action of the tire vulcanization device.
Figure 8:
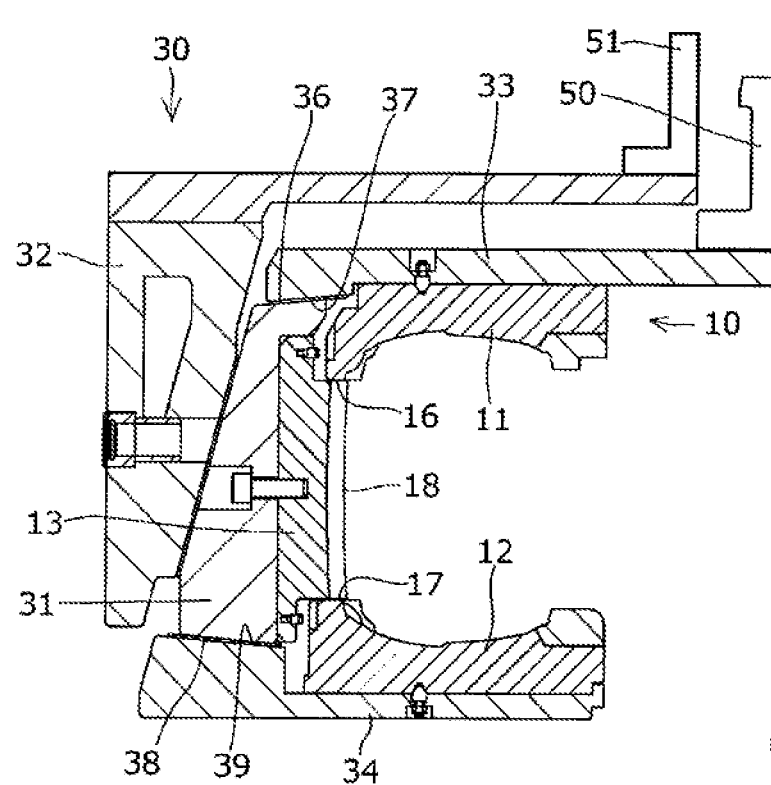
FIG. 8 is still another view used to describe the opening and closing action of the tire vulcanization device.

FIG. 6 through FIG. 8 are views used to describe an opening and closing action of the tire vulcanization device and the green tire and the bladder 60 are omitted from each drawing.

In a vulcanizing step, the green tire is attached to the vulcanization mold 10 of the tire vulcanization device in a mold open state and the bladder 60 is attached on the inner surface side of the green tire. FIG. 6 shows a mold open state in which the sector 13 and the upper side plate 11 are at positions spaced above the fixed lower side plate 12. In this state, the green tire is attached to the lower side plate 12 and then the container 30 is moved down. More specifically by moving down the first lifting means 50, the upper side plate 11 and the sector 13 provided to the upper attachment plate 33 are moved down, that is, moved toward the lower side plate 12.

When the segment 31 makes contact with the lower attachment plate 34 as is shown in FIG. 7, the sector 13 held by the segment 31 is moved inward in the tire radial direction by lifting the jacket ring 32 down by using the second lifting means 51 as is shown in FIG. 8.

In this instance, the segment 31 moves inward in the tire radial direction as the lower sliding surface 38 slides on the lower slide 39 of the lower attachment plate 34 and the upper sliding surface 36 slides on the upper slide 37 of the upper attachment plate 33. The upper sliding surface 36 and the lower sliding surface 38 incline toward the center in the tire width direction more on the outer side in the tire radial direction. Hence, when the sector 13 together with the segment 31 moves inward in the tire radial direction, the upper side plate 11 moves down due to the inclination of the upper sliding surface 36 and the sector 13 moves down due to the inclination of the lower sliding surface 38.

Figure 9:
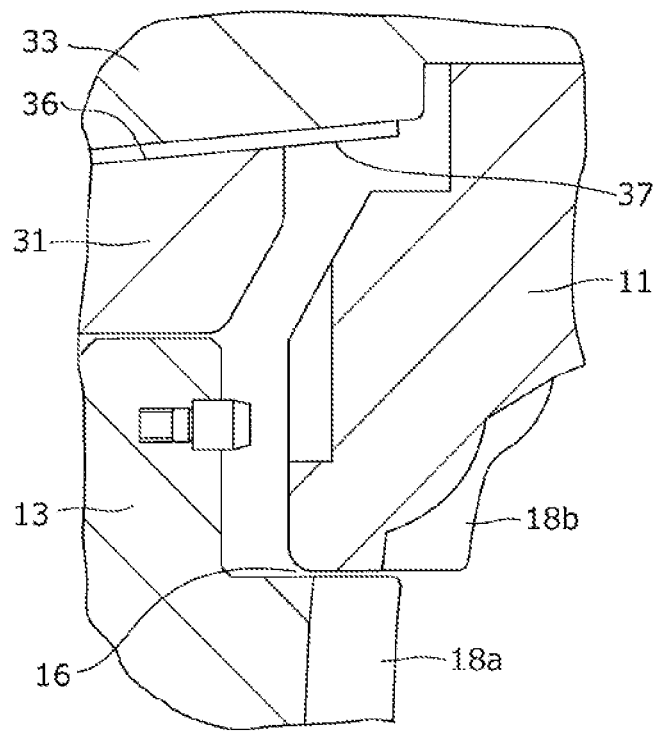
FIG. 9 is an enlarged view of a major portion of FIG. 8.
Figure 10:
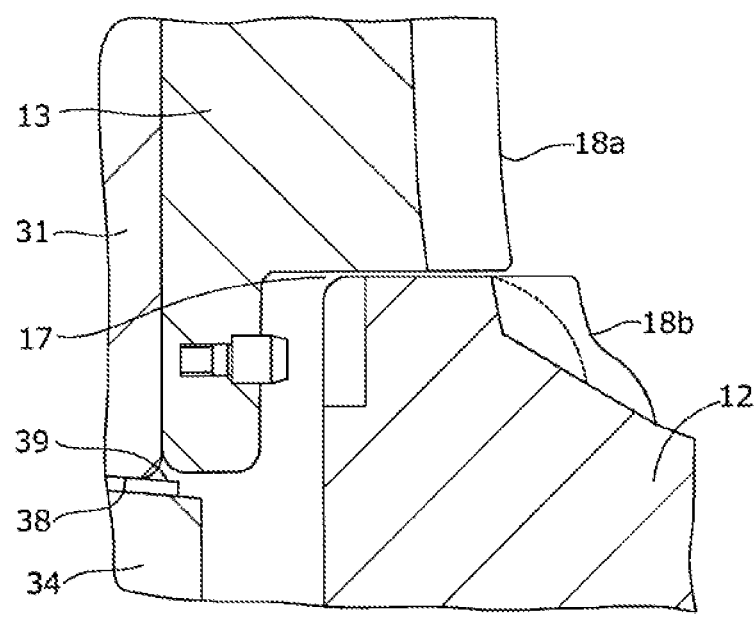
FIG. 10 is another enlarged view of the major portion of FIG. 8.

Accordingly, a distance between the upper side plate 11 and the lower side plate 12 becomes shorter as the segment 31 moves inward in the tire radial direction. Spacings at the mold parting planes 16 and 17 defined by the sector 13 and the respective upper and lower side plates 11 and 12 vanish for the first time when the mold close state shown in FIG. 1 is achieved. That is, while the sectors 13 are moving inward in the tire radial direction, as is shown in FIG. 9, a clearance is still left at the mold parting plane 16 defined by the sectors 13 and the upper side plate 11. Also, as is shown in FIG. 10, a clearance is still left at the mold parting plane 17 defined by the sector 13 and the lower side plate 12. These clearances at the mold parting planes 16 and 17 vanish when a diameter of the sectors 13 is fully reduced.

By changing the vulcanization mold 10 to the mold close state shown in FIG. 1 in the manner as above and swelling the bladder 60 with a pressurized gas supplied inside, the green tire is pressurized and heated between the vulcanization mold 10 and the bladder 60 and the green tire is vulcanized and molded to a tire T by being maintained in the state above for a predetermined time.

After the green tire is vulcanized, the vulcanization mold 10 is changed to a mold open state to perform a removing step of removing the vulcanized tire T from the tire vulcanization device. The vulcanization mold 10 is changed from the mold close state to the mold open state by performing the mold closing action inversely.

More specifically, the sector 13 held by the segment 31 is moved outward in the tire radial direction by lifting the jacket ring 32 up by using the second lifting means 51. In this instance, when the segment 31 moves outward in the tire radial direction as is shown in FIG. 8, the upper sliding surface 36 slides outward in the tire radial direction on the upper slide 37 attached to the upper attachment plate 33 while pushing up the upper attachment plate 33. Meanwhile, the lower sliding surface 38 slides outward in the tire radial direction by climbing up the lower slide 39 attached to the lower attachment plate 34.

The upper attachment plate 33 pushed up by the upper sliding surface 36 moves upward with respect to the segment 31. Hence, when the segment 31 starts to move radially outward, as is shown in FIG. 9, the upper side plate 11 also moves upward with respect to the segment 31. Hence, a spacing at the mold parting plane 16 defined by the sector 13 and the upper side plate 11 increases.

Meanwhile, in the lower sliding surface 38, when the segment 31 starts to move radially outward, as is shown in FIG. 10, the segment 31 moves upward with respect to the fixed lower attachment plate 34. Hence, a spacing at the mold parting plane 17 defined by the sector 13 and the lower side plate 12 increases.

After the diameter of the sectors 13 is fully increased as is shown in FIG. 7, the first lifting means 50 is moved up to move the upper side plate 11 and the sector 13 apart from the lower side plate 12 as is shown in FIG. 6. The vulcanized tire T is then removed from the tire vulcanization device changed to the mold open state.

In the present embodiment, the mold parting lines 16a and 17a formed by the sectors 13 and the respective side plates 11 and 12 are zigzagged in the tire circumferential direction. Hence, by fitting the zigzag shapes of the both lines, the sectors 13 and the side plates 11 and 12 can be positioned in the tire circumferential direction. That is, misalignment in the tire circumferential direction can be limited. Consequently, outward appearance of the tread portion 1 where the mold parting lines 16a and 17a pass can be enhanced and tire performance can be ensured.

By forming the mold parting lines in a zigzag shape, in the event that the land portions in the shoulder regions have sipes and sipe positions in the tire width direction are different between the adjacent land portions, the mold parting lines can be set to the respective land portions by avoiding the sipes. Alternatively, when sipe depths are different in the tire width direction, the mold parting lines can be set to the respective lands by avoiding a deep sipe position. Generally, a blade used to mold a sipe in the tread portion and provided to the side plate is hard to remove particularly when the sipe is deep, which may possibly cause breaking or the like. However, such a problem can be eliminated by the present embodiment.

In a design in which a distance from the tire equator CL to the tire contact end changes periodically in the tire circumferential direction by having the first block end 7a and the second block end a, the mold parting lines 16a and 17a include the first line segments 16a1 and 17al along the first block end 7a and the second line segments 16a2 and 17a2 along the second block end 8a. Hence, in the event that rubber is squeezed out from the mold parting lines 16a and 17a, the present embodiment can make an individual perceive the squeezed-out rubber as a part of the surface design, which can in turn enhance the outward appearance.

The respective bent portions 17a4 of the mold parting lines 16a and 17a are formed in a curved shape. Hence, positioning accuracy in the tire circumferential direction can be improved by enhancing workability.

The mold parting lines 16a and 17a formed by the sectors 13 and the respective side plates 11 and 12 are set to pass the bend points 8c of the surface design of the tread portion 1. Hence, in the event that rubber is squeezed out from the mold parting lines 16a and 17a in the vicinity of the bend points 8c, an individual perceives the squeezed-out rubber passing the bend points 8c as a part of the surface design. When the mold parting lines are set to pass the bend points of the surface design, the mold parting lines do not necessarily have to pass all the bend points and may be set to pass at least one bend point.

In the present embodiment, the upper sliding surface 36 and the lower sliding surface 38 sliding, respectively, on the upper attachment plate 33 and the lower attachment plate 34 incline toward the center in the tire width direction more on the outer side in the tire radial direction. Hence, when the segment 31 starts to move radially outward, spacings at the mold parting planes 16 and 17 defined by the sectors 13 and the upper side plate 11 and the lower side plate 12, respectively, increase. Accordingly, even when the tire vulcanization device is repetitively opened and closed, rubbing of the mold parting planes 16 and 17 do not occur and spacings at the mold parting planes 16 and 17 can be maintained at an appropriate value. Durability of the tire vulcanization device can be thus enhanced. Moreover, the upper side plate 11 moves in a direction to separate from the vulcanized and molded tire T as soon as the segment 31 starts to move radially outward. Hence, the tire T can be readily released from the mold.

In the tire vulcanization device of the present embodiment, when the upper sliding surface 36 and the lower sliding surface 38 provided to the segment 31 are planes sliding, respectively, on the upper slide 37 and the lower slide 39 in a surface-contact state, the segment 31 is allowed to move with high positional accuracy without rattling. Misalignment of the sector 13 in a mold closed state can be thus limited.

In the present embodiment, the mold parting planes 16 and 17 are provided parallel to the tire radial direction. However, the mold parting planes 16 and 17 may be provided to incline diagonally with respect to the tire radial direction. That is, the mold parting planes 16 and 17 may be provided to incline to the outer side in the tire width direction more on the outer side in the tire radial direction. In such a case, too, a tire can be readily released from the mold owing to the inclinations of the upper sliding surface 36 and the lower sliding surface 38. In addition, in the event that the sliding surfaces 36 and 38 wear out due to repetitive mold opening and closing actions and an interval between the upper side plate 11 and the lower side plate 12 becomes narrower, the mold can be closed by gradually narrowing an interval between the upper side plate 11 and the lower side plate 12 in association with a movement of the segment 31 in the tire radial direction. Hence, rubbing of the mold parting planes 16 and 17 at an early stage can be limited, which can in turn enhance durability.

The embodiment above has described a case where the shoulder region has two tread end positions. However, the shoulder region may have three or more tread end positions. For example, the shoulder region may include the first land portion 7 having the first tread end 7a and the second land portion 8 having the second tread end 8a plus a third land portion having a third tread end located at a different position in the tire width direction from the first and second tread ends. In such a case, the mold parting lines preferably include a third line segment extending along the third tread end.

The mold parting lines may be set to be superimposed on any one of the tread ends. In the embodiment above, the mold parting lines are set to be parallel to the tire circumferential direction in the land portions and to incline in the lateral groove. However, the mold parting lines may be set conversely to be parallel to the tire circumferential direction in the lateral groove and to incline in the land portions. Alternatively, the mold parting lines may be set to incline in both of the land portions and the lateral groove. In short, various shapes can be adopted.

A tire referred to in the present embodiment includes a tire designed for an automobile, a heavy load tire designed for a truck, a bus, and a light truck (for example, a SUV or a pickup truck), and a pneumatic tire designed for various types of vehicles.

The embodiments above are presented as examples and have no intention to limit the scope of the invention. These novel embodiments can be implemented in various other manners and various omissions, replacements, and changes can be made within the spirit and scope of the invention.

REFERENCE SIGNS LIST

1: tread portion, 2: sidewall portion, 3: bead portion, 5: lateral groove, 7: first land portion, 7a: first tread end, 8: second land portion, 8a: second tread end, 8b: ridge line, 8c: bend point, 10: vulcanization mold, 11: upper side plate, 12: lower side plate. 13: sector, 16 and 17: mold parting planes, 16a and 17a: mold parting lines, 16al and 17al: first line segment, 16a2 and 17a2: second bent line, 17a4: bent portion. 31: segment, 33: upper attachment plate, 34: lower attachment plate, 36: upper sliding surface, 38: lower sliding surface

The invention claimed is:

1. A tire vulcanization mold used to vulcanize and mold a tire, comprising:
sectors divided in a tire circumferential direction and molding a tread portion of the tire; and
a pair of upper and lower side plates molding a sidewall portion of the tire,
wherein mold parting lines formed by the sectors and the pair of the upper and lower side plates are located in the tread portion and a distance from a tire equator to the mold parting lines changes periodically in the tire circumferential direction, and wherein:

the tread portion includes a first land portion having a first tread end and a second land portion having a second tread end located further from a center of a tire width direction than the first tread end in the tire width direction; and each of the mold parting lines includes a first line segment extending along the first tread end and a second line segment extending along the second tread end.

2. The tire vulcanization mold according to claim 1, wherein:

respective bent portions of each of the mold parting lines are formed in a curved shape.

3. The tire vulcanization mold according to claim 1, wherein:

each of the mold parting lines is set to pass a bend point of a surface design in the tread portion.

4. The tire vulcanization mold according to claim 3, wherein:

the bend point of the surface design is a bend point of a ridge line along a lateral groove in the second land portion located in a shoulder region of the tread portion.

5. A tire vulcanization device, comprising:

the tire vulcanization mold set forth in claim 1;

segments fixed to the sectors and moving the sectors in a tire radial direction; and a pair of upper and lower container attachment plates fixed to the pair of the upper and lower side plates, respectively, and supporting the segments in a slidable manner.

6. The tire vulcanization device according to claim 5, wherein:

the segments include a pair of upper and lower sliding surfaces sliding on the pair of upper and lower container attachment plates, respectively;

the pair of the upper and lower sliding surfaces extend in a tire radial direction and incline towards a center of the tire vulcanization device in a tire width direction; and when the segments moves the sectors outward in the tire radial direction, the pair of the upper and lower sliding surfaces slides on the pair of upper and lower container attachment plates, respectively, and spacings at mold parting planes including the mold parting lines widen.

7. The tire vulcanization device according to claim 6, wherein:

the mold parting planes including the mold parting lines are provided parallel to the tire radial direction.

8. A tire production method, comprising:

a forming step of forming a green tire; and a vulcanizing step of vulcanizing and molding the green tire by using the tire vulcanization device set forth in claim 5.

9. A tire production method, comprising:

a forming step of forming a green tire; and a vulcanizing step of vulcanizing and molding the green tire by using the tire vulcanization device set forth in claim 6.

10. A tire production method, comprising:

a forming step of forming a green tire; and a vulcanizing step of vulcanizing and molding the green tire by using the tire vulcanization device set forth in claim 7.

* * * * *